United States Patent [19]

Shah

[11] Patent Number: 5,463,493
[45] Date of Patent: Oct. 31, 1995

[54] ACOUSTO-OPTIC POLYCHROMATIC LIGHT MODULATOR

[75] Inventor: Manhar L. Shah, Melbourne Beach, Fla.

[73] Assignee: MVM Electronics, Melbourne, Fla.

[21] Appl. No.: 5,992

[22] Filed: Jan. 19, 1993

[51] Int. Cl.$^6$ .................................................. G02F 1/33
[52] U.S. Cl. ......................... 359/312; 359/308; 359/309
[58] Field of Search ................................... 359/309, 312, 359/313, 308, 314

[56] References Cited

U.S. PATENT DOCUMENTS

| | | | |
|---|---|---|---|
| RE. 29,557 | 2/1978 | Isaacs et al. | 423/299 |
| 3,462,212 | 8/1969 | Denton | 359/309 |
| 3,666,349 | 4/1972 | Hubby, Jr. . | |
| 3,746,866 | 7/1973 | Feichter et al. | 359/305 |
| 3,799,659 | 3/1974 | Roland et al. | 359/285 |
| 3,938,881 | 2/1976 | Biegelsen et al. | 359/305 |
| 3,944,334 | 3/1976 | Vano et al. | 359/313 |
| 3,944,335 | 3/1976 | Saito et al. | 359/308 |
| 3,953,107 | 4/1976 | Yano et al. | 359/308 |
| 3,958,863 | 5/1976 | Isaacs et al. | 359/305 |
| 3,982,817 | 9/1976 | Feichtner | 359/308 |
| 4,037,933 | 7/1977 | Yano et al. | 359/314 |
| 4,052,121 | 10/1977 | Chang | 359/314 |
| 4,150,880 | 4/1979 | Howe et al. | 359/309 |
| 4,170,028 | 10/1979 | DeBenedictis et al. | 358/481 |
| 4,213,158 | 7/1980 | DeBenedicitis | 358/296 |
| 4,217,036 | 8/1980 | Chang | 359/286 |
| 4,299,449 | 11/1981 | Ohta | 359/286 |
| 4,342,502 | 8/1982 | Chang | 359/286 |
| 4,346,965 | 8/1982 | Sprague et al. | 359/285 |
| 4,357,627 | 11/1982 | Johnson | 358/348 |
| 4,381,887 | 5/1983 | Guerin et al. | 359/311 |
| 4,505,550 | 3/1985 | Steinbruegge | 359/308 |
| 4,555,160 | 11/1985 | Gottlieb et al. | 359/311 |
| 4,575,186 | 3/1986 | Gottlieb et al. | 359/308 |
| 4,582,397 | 4/1986 | Chang | 359/314 |

(List continued on next page.)

OTHER PUBLICATIONS

"Tunable Acousto–Optic Filters: An Overview"; by I. C. Chang, Applied Technology Division of Itek Corporation; Sep./Oct. 1977/vol. 16, No. 5/Optical Engineering; pp. 455–460.

"Independent Acoustooptic Modulation of the Two Wavelengths of a Bichromatic Light Beam"; by M. G. Gzalet, G. Waxin, J. M. Rouvaen, R. Torquet and E. Bridoux; *Appllied Optics* /vol. 23, No. 5/ Mar. 1984, pp. 674–681.

"Acousto–Optic Devices: Diverse Applications" by Marcus Noble; *Lasers & Optronics*, Mar. 1992.

"Polychromatic AOM Improves Laser Graphics Projectors", *Laser Focus World*, May, 1992, pp. 17–18.

Primary Examiner—Scott J. Sugarman
Assistant Examiner—Thomas Robbins
Attorney, Agent, or Firm—Charles Wands

[57] ABSTRACT

An acousto-optic polychromatic light modulating apparatus employs an acousto-optic medium, and a single piezoelectric transducer, which is driven by a plurality of frequency components, the intensities of which are controlled in response to input electronic data, to produce a color-modulated diffracted polychromatic output beam. The acousto-optic medium and mode as well as acousto-optic interaction length and the geometry of the device are selected such that there is negligible acousto-optic interaction with a given frequency signal on all output optical beam colors except for the one assigned to that frequency, with a high degree of color convergence achieved over a wide wavelength range. The present invention can be used to increase the modulation rate of a polychromatic modulator by selecting the incident optical beam energy propagation direction to be nearly normal to the acoustic wave phase propagation direction with non-parallel tangents at the incident and diffracted optical wave-vector loci. It may also be incorporated within the laser cavity of a discrete line laser and in the laser cavity of a continuous band laser, thereby enabling the selection or tuning of one or more wavelengths simultaneously. The use of a multi-frequency input RF driver enables the laser to be tuned electronically at high speed, without mechanical movement of any physical components.

37 Claims, 11 Drawing Sheets

U.S. PATENT DOCUMENTS

| | | | |
|---|---|---|---|
| 4,591,241 | 5/1986 | Huignard | 359/306 |
| 4,602,342 | 7/1986 | Gottlieb et al. | 359/308 |
| 4,637,688 | 1/1987 | Abramovitz | 359/311 |
| 4.637,689 | 1/1987 | Chang | 350/311 |
| 4,639,092 | 1/1987 | Gottlieb et al. | 359/308 |
| 4,653,869 | 3/1987 | Gottlieb et al. | 359/308 |
| 4,658,772 | 8/1987 | Chang | 359/308 |
| 4,671,620 | 6/1987 | Yao | 359/311 |
| 4,705,362 | 11/1987 | Ryan et al. | 359/308 |
| 4,720,177 | 1/1988 | Chang | 359/305 |
| 4,798,449 | 1/1989 | Vichon et al. | 359/309 |
| 4,974,943 | 12/1990 | Noguchi | 359/305 |
| 5,034,627 | 7/1991 | Ayral et al. | 359/305 |
| 5,083,856 | 1/1992 | Hatori et al. | 359/285 |
| 5,107,368 | 4/1992 | Noguchi | 359/285 |

FIG. 1

(PRIOR ART)

ACOUSTO-OPTIC POLYCHROMATIC LIGHT MODULATOR

FIELD OF THE INVENTION

The present invention relates in general to acousto-optic modulators and is particularly directed to a method and apparatus for modulating a polychromatic light (light containing more than one color or wavelength, as opposed to monochromatic light) beam by means of a single acousto-optic transducer.

BACKGROUND OF THE INVENTION

Acousto-optic modulators have been employed to control the respective intensities of multiple color (red-R, green-G and blue-B) components of multi-color laser projector systems. This is typically accomplished by using a respective modulator for each color or wavelength, and then recombining each of the beams into a single output beam by means of dichroic beam combiners. It is necessary to employ monochromatic modulation, since a common acousto-optic modulator is insensitive to color or wavelength. Disadvantageously, the cost, size, complexity, and the number of alignments of the system components required to implement such a parallel system are fairly substantial.

A laser projector system design can be considerably simplified, if the modulator is capable of accepting an effectively collinear "white" polychromatic light beam (i.e. a beam containing a sufficient number of different wavelengths or colors to produce a full spectrum color perception to the human visual system), and is able to produce an effectively collinear output beam, the color composition of which is controllable, as by means of electrical signal inputs. Namely, the desired output color is to be defined by electronically controlling the intensity of each color or wavelength component of the "white" beam.

Figure 1:
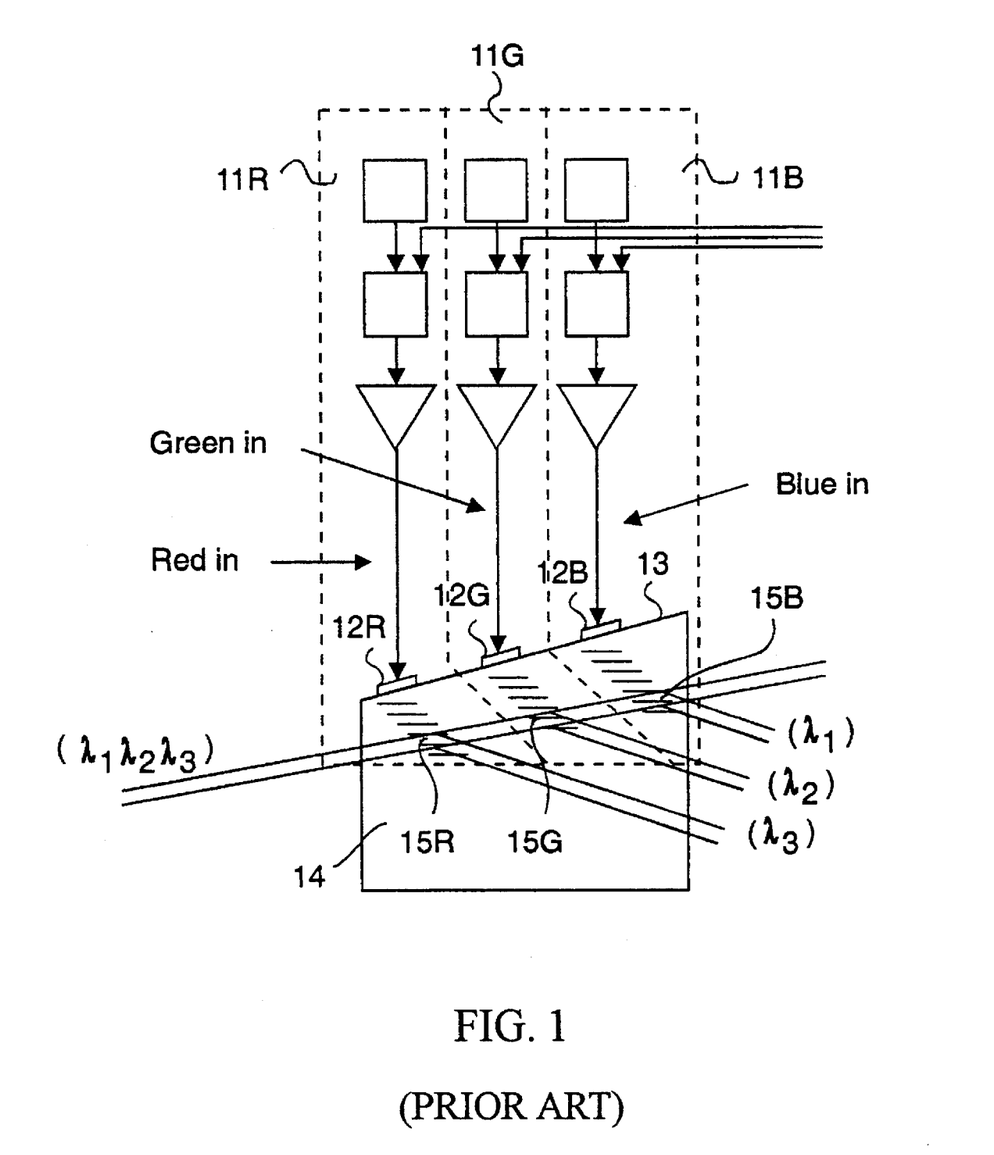
FIG. 1 is a diagrammatic illustration of a prior art three color (RGB) modulator, described in the above-referenced technical data sheet by Optikon Corporation and the U.S. Pat. No. to Vichon et al, No. 4,798,449.

There have been several proposals to combine acousto-optic modulation of an RGB beam by means of a 'pseudo-single' device. Specifically, each of a technical data sheet entitled "Acousto-optic Device Provides Polychromatic Images," by Optikon Corporation Ltd., 410 Conestoga Road, Waterloo, Ontario, Canada, N2L 4E2, and the U.S. Pat. No. to Vichon et al, No. 4,798,449, describes a polychromatic acousto-optic modulation system, diagrammatically illustrated in FIG. 1, in which individual red-R, green-G, and blue-B modulators 11R, 11G, 11B are coupled to respective transducers 12R, 12G and 12B mounted in series on a common face 13 of a single acousto-optic medium 14. In such an arrangement, the amount of crosstalk, i.e. the undesirable effect of having the modulation of a specific wavelength or color leak into or affect the other colors, is minimized by physically separating the modulating regions 15R, 15G, 15B for the respective colors. Among shortcomings of this arrangement are the fact that its size, cost and complexity are undesirably large, its operation is limited to only a few wavelengths (e.g. three for a currently available device) and it suffers from poor color convergence.

Figure 2A:
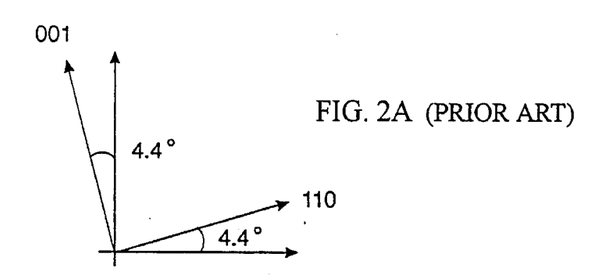
FIG. 2A is a crystalline coordinate axis diagram associated with FIG. 2.
Figure 2B:
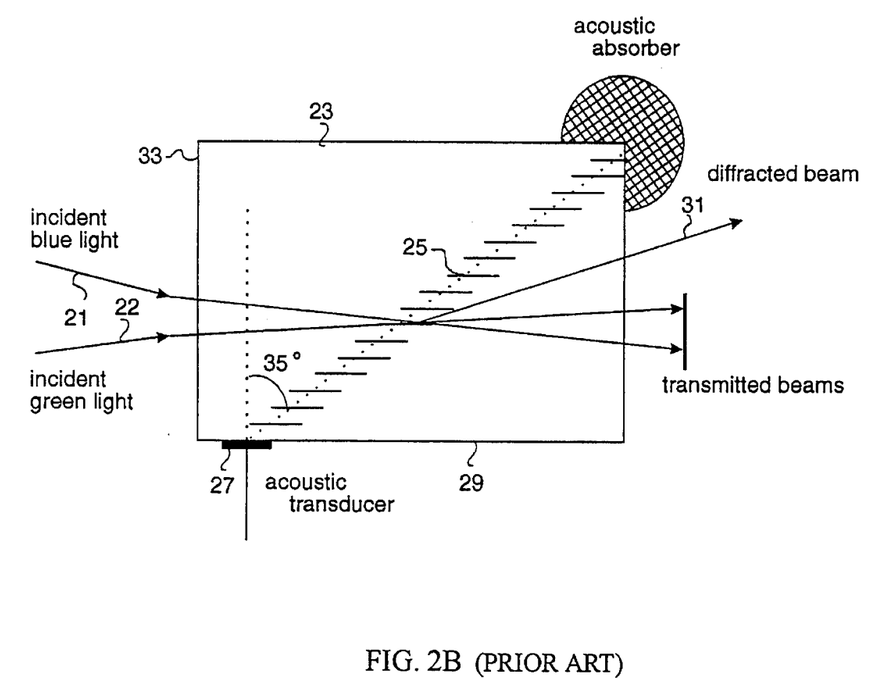
FIG. 2B is a diagrammatic illustration of a prior art bichromatic modulator described in the above-referenced article by M. Gazalet et al.

Another type of device, diagrammatically illustrated in FIG. 2, having a crystalline coordinate axis diagram shown in FIG. 2A, and described in an article by M. Gazalet et al, entitled "Independent acousto-optic modulation of the two wavelengths of a bichromatic light beam," Applied Optics, Vol. 23, No. 5, 1 Mar. 1984, pp. 674–681, relies upon the angular difference (separation) of each of a plurality of input color beams 21, 22 with respect to acousto-optic medium 23, for each designated color (wavelength), in order to reduce inter-color modulation. This is accomplished as a result of a selective Bragg matching condition for an acoustic wave 25 launched by a transducer 27, mounted on a face 29 of acousto-optic medium 23.

In a conventional acousto-optic device, if the selectivity of the device with respect to wavelength is narrow for the purpose of restricting acousto-optic interaction with only a single color, two undesirable effects occur. First, the selectivity of the angular range of the optical beam also becomes narrow; secondly, the required transducer length (i.e. acousto-optic interaction length) becomes excessively large. The narrow angular range of the beam results in a distortion of the output or diffracted beam, while an increased transducer length may be impractical to implement. As a result, it is essential that angular separation of the colors at the input side 33 of the device be maintained.

It will be appreciated that criteria which dictate the design of conventional multi-color modulators, described above, restrict the number of selectable colors making up the output beam to only a few (two or three) and require the use of a relatively long transducer at a high operating frequency band. In addition, inter-color crosstalk is poor and, because of this custom design approach, the operational wavelengths must be specified in advance and match the operating parameters of the device, which makes the device configuration inflexible, so that it cannot be mass-produced for multiple applications.

SUMMARY OF THE INVENTION

In accordance with the present invention, the above described drawbacks of conventional polychromatic acousto-optic modulators are effectively obviated by an acousto-optic polychromatic light modulating apparatus, which employs an acousto-optic medium and a single piezoelectric transducer attached to the acousto-optic medium to convert a multi-frequency electrical input signal into ultrasonic waves for modulating a multi-wavelength input light beam. An electronic driver supplies electrical signals containing a plurality of different frequency components, the intensities of which are controlled in response to input electronic data, so as to produce a desired multi optical frequency (e.g. color) beam output from the diffracted polychromatic output beam.

The inventive apparatus is configured to receive an effectively collinear polychromatic light beam and output an effectively collinear polychromatic first order (+ or − first order) diffracted light beam. The acousto-optic medium, mode, acousto-optic interaction length and the geometry of the device are selected such that there is a negligible acousto-optic interaction with a given frequency signal on all output optical beam wavelengths, except for the one assigned to that frequency. A high degree of color convergence is achieved over a wide wavelength range (such as the entire visible spectrum covering the 450–700 nm band or some prescribed infrared or ultraviolet band).

The present invention is operative to produce a substantially collinear polychromatic output light beam with negligible beam distortion having an intended color composition in response to electronic data. In order to utilize the inventive polychromatic modulator in a variety of practical applications, it is desirable that the polychromatic modulator have negligible inter-color modulation, greater that 90% and preferably on the order of 100% optical throughput utilizing low RF drive power, small size, only a single (piezoelectric) transducer, a high degree of color convergence, and the ability to modulate an input beam containing (substantially) more than two wavelengths. Moreover, in some applications it is also desirable that the polychromatic modulator operate on randomly polarized input light and produce either a single highly convergent polychromatic output beam, or two independent highly convergent polychromatic output beams with orthogonal polarization.

The present invention is also operative to increase the modulation rate of a polychromatic modulator by arranging (or selecting) the incident optical beam energy propagation direction to be at, or nearly normal to, the acoustic wave phase propagation direction with non-parallel tangents at the incident and diffracted optical wave-vector loci. A high modulation rate is also achievable with the use of higher acoustic velocity of the acousto-optic material in the construction of the polychromatic modulator.

DETAILED DESCRIPTION

In order to appreciate the functionality of the modulation technique employed by the polychromatic modulation apparatus in accordance with the present invention, it is initially useful to examine acousto-optic filtering mechanisms described in the U.S. Pat. No. to Yano et al, No. 3,953,107 entitled "Acousto-optic Filter" and the U.S. Pat. No. to Chang, No. 4,052,121, entitled "Noncollinear Tunable Acousto-optic Filter." The fundamental characteristic of such acousto-optic filters is the use of a narrow spectral pass-band for a single given acoustic signal frequency.

Rather than employ the mechanisms described in these patents to produce a single monochromatic output beam, the present invention utilizes RF excitation with two or more frequency components to generate an output light beam containing two or more colors or wavelengths. It has been found that, in the acousto-optic filter case, simultaneous excitation of the acousto-optic transducer by a plurality of RF frequencies does not produce inter-color modulation of the input beam, as commonly occurs in a conventional monochromatic acousto-optic modulator.

Figure 4:
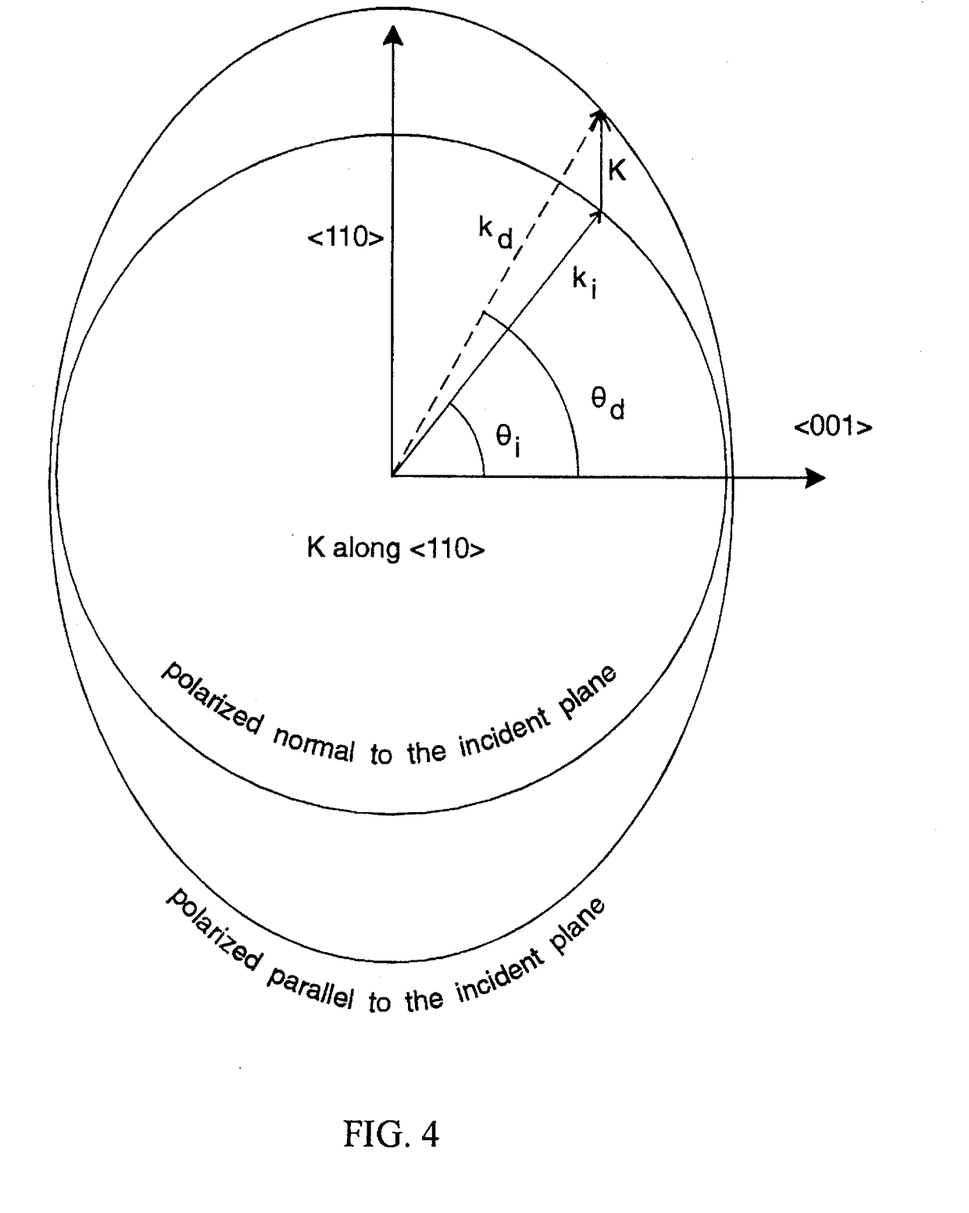
FIG. 4 is a Bragg matching diagram for far off-axis an isotropic diffraction.

The present invention employs an optically anisotropic $TeO_2$ crystal (a well known acousto-optic material having a high acousto-optic figure of merit), and far-off-axis anisotropic Bragg diffraction, which is diagrammatically illustrated in FIG. 4 as the Bragg matching diagram, and is described in the above-referenced U.S. Pat. No. to Yano et al, No. 3,953,107. Although the parallel tangents to the loci of incident and diffracted optical wave-vector conditions, as described in the above-referenced U.S. Pat. No. to Change, No. 4,052,121, could possibly be used, they have disadvantages of operating at higher RF frequencies, requiring higher RF drive power, and a larger $TeO_2$ crystal size in comparison to far-off-axis diffraction.

Figure 3A:
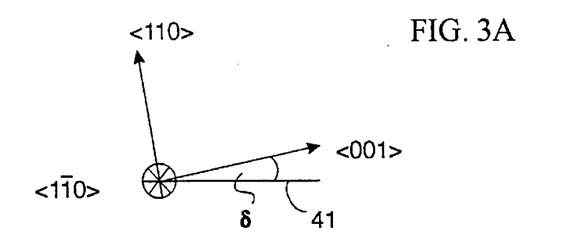
FIG. 3A is a crystalline coordinate axis diagram associated with FIG. 3.
Figure 3B:
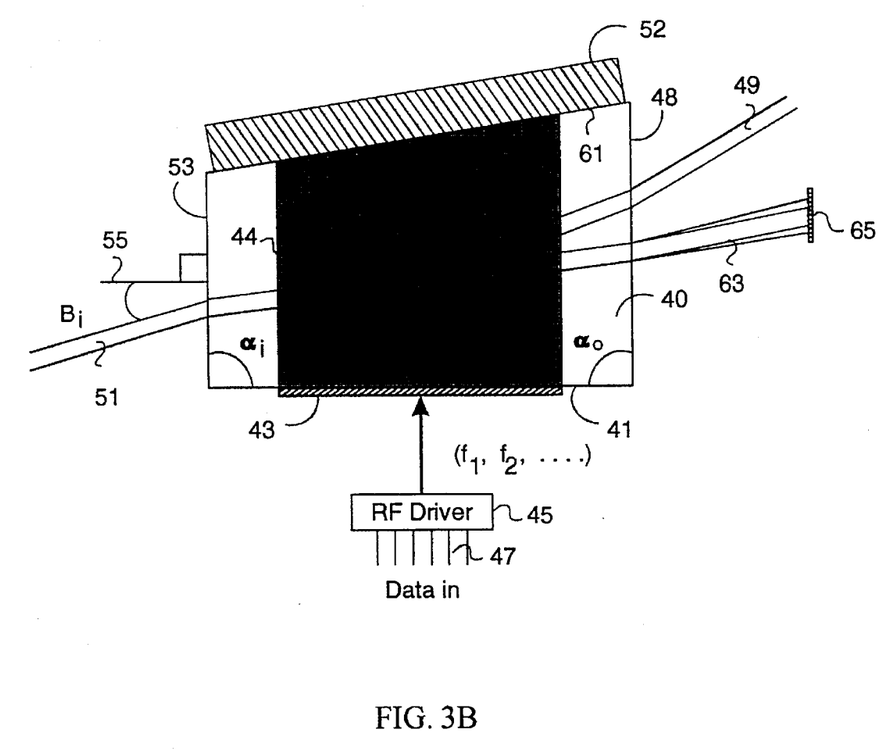
FIG. 3B is a diagrammatic illustration of a preferred embodiment of a polychromatic modulator in accordance with the invention.

Referring now to FIG. 3, a preferred embodiment of the present invention is diagrammatically illustrated as comprising an acousto-optic body 40. Acousto-optic body 40 may comprise a material selected from the group consisting of $TeO_2$, $Hg_2Cl_2$, $Hg_2Br_2$, $Hg_2I_2$, $PbCl_2$, $PbBr_2$, $Tl_3AsS_4$, $Tl_3VS_4$, $Tl_3NbS_4$, $Tl_3AsSe_3$, $Tl_3TaS_4$, $Tl_3TaSe_4$, $CaMoO_4$, $LiNbO_3$, $CaWoO_4$, $PbMoO_4$, and crystalline quartz. For the example shown in FIG. 3, body 40 is made of $TeO_2$ bulk crystal material, upon a modulating acoustic beam launching face 41 of which a single piezoelectric transducer 43 is bonded. Transducer 43 is excited by means of a multi-frequency RF drive signal generated by a driver 45, which generates at least two RF output frequencies, parenthetically represented by f1, f2, . . . , etc. In the embodiment of FIG. 3, the magnitude of each RF frequency signal produced by generator 45 is determined by a set of input data lines 47.

A substantially collinear, polychromatic input light beam 51, the color composition of which is to be modulated, is directed upon a light input face 53 of acousto-optic body 40 at an incidence angle $B_i$ relative to a normal 55. Light input face 53 is oriented at an angle $\alpha_i$ with respect to transducer bonding face 41. In the preferred embodiment of FIG. 3, transducer bonding face 41 is selected to align within a small angle $\delta$ ($\delta$ smaller than 4°) of the {110} crystalline plane of $TeO_2$, as shown in the coordinate axis diagram of FIG. 3A. The direction of acoustic propagation of an acoustic wave 44 launched by transducer 43 is along within a small angle δ to the <110> direction and acoustic shear waves are polarized along the <110> direction of TeO$_2$. The optical propagation direction of beam 51 within crystal 40 makes a large (greater than 5°) angle relative to the <001> crystalline direction of the TeO$_2$ medium.

The interaction of the (RF signal-containing) acoustic wave 44 launched from transducer 43 with the incident light beam 51 causes the diffraction of an output polychromatic light beam 49, Which is diffracted from exit face 48 of acousto-optic body 40, exit face 48 forming an acute angle $\alpha_o$ with transducer mounting face 41. The acoustic waves 44 launched into body 40 from transducer 43 are absorbed by an acoustic absorber 52, which is bonded (cemented) to a face 61 opposite to the transducer bonding face 41. Undiffracted light 63 is intercepted and blocked by a beam stop 65.

The angles $\alpha_o$, $\alpha_i$ and B$_i$ are defined to accommodate any dispersion effect of the material of the acousto-optic bulk 40 and acousto-optic interaction, thereby ensuring a high degree of color convergence in the output beam 49. The computation of these angles is based upon acousto-optic interaction, refractive index dispersion with wavelength for the chosen material and Snell's law of refraction. As a non-limitative example, the angle $\alpha_i$ may be selected to be equal to 90° in order to facilitate fabrication of the device. Computations have shown that using this angle and setting δ=0°, $\alpha_o$=88.7° and B$_i$=29.5° provide an excellent (better than 0.01°) convergence for output beam 49 over the entire visible region (450–700 nm wavelength range) and an RF frequency band from 28–52 MHz for the visible region.

It is possible to select a different frequency range by changing the value of B$_i$, with generally higher frequencies for larger values of B$_i$ and lower frequencies for smaller values of B$_i$. The value of $\alpha_o$ to obtain the best convergence for output beam 49 also changes with B$_i$. A value of $\alpha_i$ other than 90 degrees is also possible with different values set for B$_i$ and $\alpha_o$. The entrance face 53 and the exit face 48 of the acousto-optic medium 40 may be non-parallel by at least 0.5 degrees, so as to accept and output a substantially co-linear polychromatic light beam.

In the embodiment shown in FIG. 3, incident light beam 51 is polarized along the direction of shear acoustic wave polarization, while the diffracted output light beam 49 is polarized in a direction orthogonal to the direction of shear acoustic wave polarization. It is also possible to reverse these directions of light beam polarization. Inter-color modulation, spectral selectivity, and output beam distortion are dependent upon the far-off-axis Bragg diffraction angle (the angle between the incident light beam 51 and acoustic wave propagation directions within the interior of the acousto-optic material, diagrammatically illustrated in FIG. 4) and transducer length (the acousto-optic interaction length).

Figure 5:
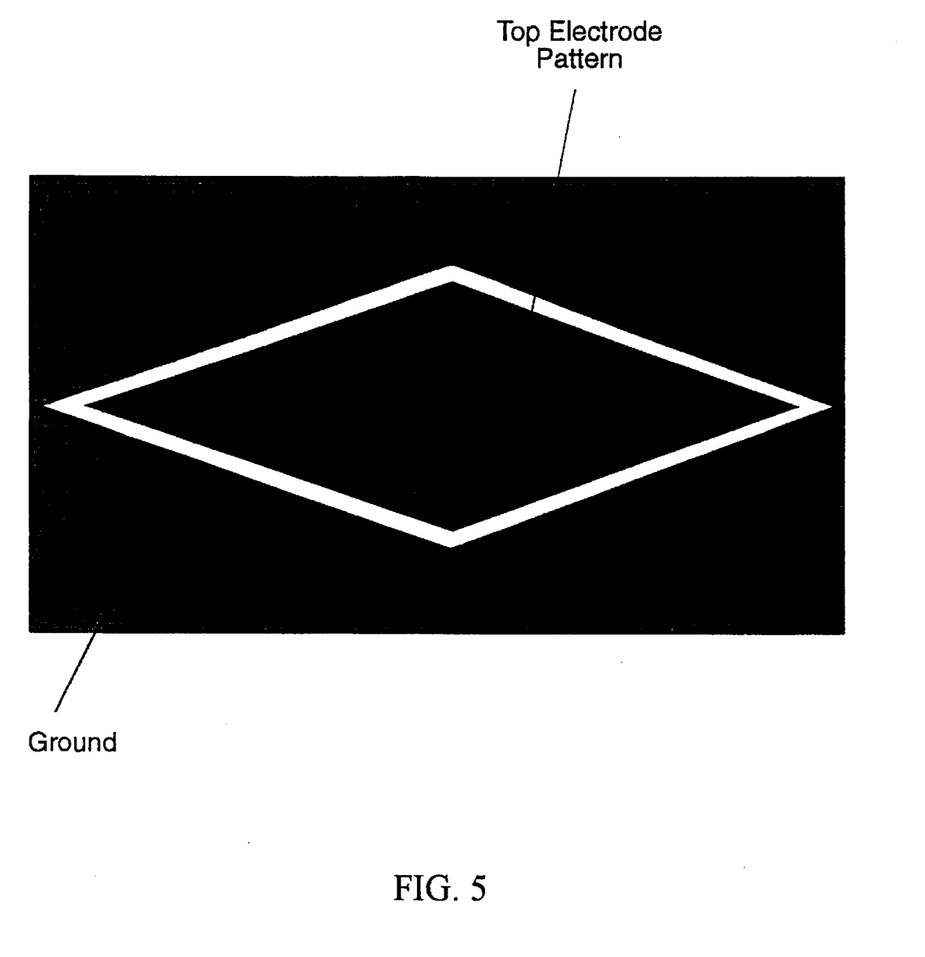
FIG. 5 shows an electrode pattern of an apodized transducer that may be used in an embodiment of a polychromatic light modulator in accordance with the invention.

In order to reduce side lobes the shape of transducer 41 may be trapezoidal, as shown in FIG. 5. It should be observed, however, that this trapezoidal apodization of the transducer's shape is one of many apodization shapes, such as Gaussian, elliptical, cosine, etc., that may be employed.

In the embodiment of FIG. 3, making the direction of propagation of acoustic wave 44 coincide with the <110> direction of the TeO$_2$ crystal, in the far-off-axis diffraction condition, results in a highly efficient polychromatic modulation device. With continuing improvements in laser projection technology, it is anticipated that a polychromatic modulator with characteristics as described herein, plus a modulation speed approaching 6 MHz or higher, will be needed for video rate projection. The slow acoustic velocity of the shear mode along the <110> direction for a TeO$_2$ crystal, combined with a large angle between the acoustic wave vector and incident optical energy propagation direction in the far-off-axis diffraction condition (as chosen for the preferred embodiment) results in the polychromatic modulator having a relatively slow modulation rate. Namely, the modulation rate of the embodiment of FIG. 3, having a beam incidence angle B$_i$ of 29.5 degrees, is limited to approximately 250 kHz, due the large transit time of the acoustic waves through the interactive optical energy region within the acousto-optic bulk material 40.

Although one objective of an optical modulator is to achieve as high a modulation rate as possible, there must be trade-offs among RF power, acoustic power density requirements, RF frequency range, and permissible optical power density. A higher modulation speed usually occurs with unfavorable effects on other parameters. The embodiment of FIG. 3 has been optimized for the other parameters with the assumption that modulation speed is non-critical.

In those applications where a higher modulation speed is required, the acousto-optic interaction is chosen such that the acoustic transit time across the incident optical beam width is minimized, while the acoustic wave vector is chosen to maximize the angle with the tangent to the locus of the diffracted optical wave vector. Moreover, acoustic waves having a higher acoustic velocity are used, if possible. Unfortunately, a higher acoustic wave velocity is accompanied by a lower acousto-optic figure of merit. As a consequence, it is not always possible to employ a high acoustic velocity condition.

Figure 6:
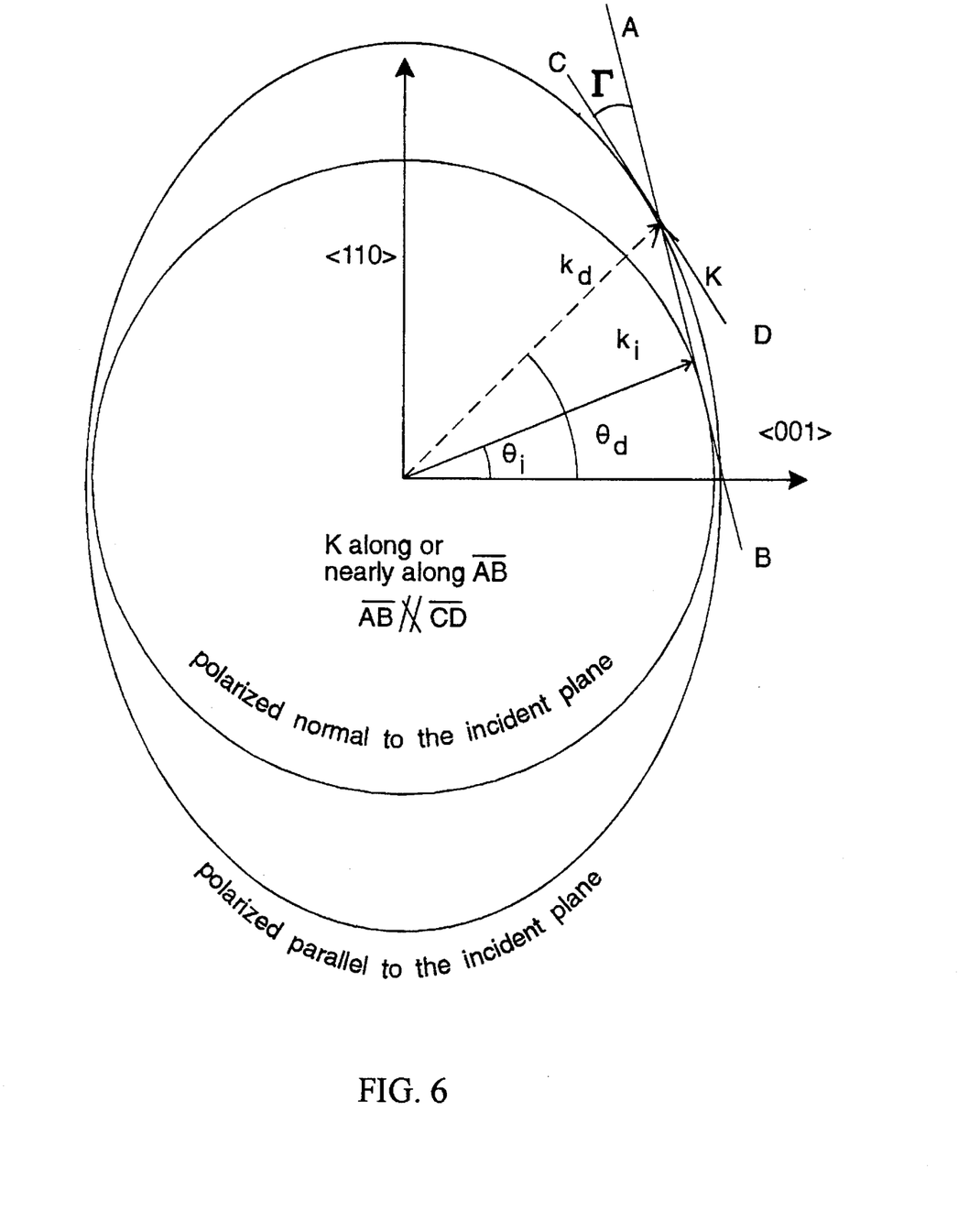
FIG. 6 is a Bragg matching diagram, illustrating how to increase the modulation speed of a polychromatic light modulator in accordance with the present invention by selecting the acoustic wave phase propagation direction to be at, or nearly normal to, the incident optical wave energy propagation direction.

FIG. 6 is a Bragg matching diagram, illustrating how to select a configuration for the acousto-optic interaction region, in order to optimize polychromatic light modulator speed for given acoustic velocity and refractive indices. To achieve the shortest transit time for the acoustic waves through the acousto-optic interactive region with the incident optical beam, the acoustic phase propagation direction, shown by arrow K, is selected to coincide, as close as possible, with the line AB, which is the tangent to the locus of incident optical wave vector, k$_i$. It should be noted that this differs from the acoustic wave group or energy propagation direction described, for example, in the U.S. Pat. No. to Chang, No. 4,342,502, entitled "Transverse Tunable Acousto-optic Filter." The angle Γ, between the acoustic wave propagation direction and the tangent line CD to the locus of the diffracted optical wave vector k$_d$, is selected to be as large as possible with the constraints imposed by other polychromatic modulator requirements, such as size, RF drive power, spectral sensitivity, incident optical beam angular spread, operating RF frequency range, etc.

In the course of designing a polychromatic acousto-optic modulator, the parameters of the chosen acousto-optic material, particularly, its acoustic velocity, refractive indices, and acousto-optic figure of merit, play a crucial role. These parameters are sensitive to the crystallographic orientation of the acousto-optic bulk material for the chosen optical and acoustic wave propagation. The performance of a polychromatic acousto-optic modulator can be optimized by selecting the crystalline orientation of the acousto-optic material. One particular method which can be applied is the so called optical rotation in TeO$_2$, as described by G. Elston in an article entitled "Optically and Acoustically Rotated Slow Shear Bragg Cells in TeO$_2$," and reported in SPIE Vol 936, Advances in Optical Information Processing III, 1988, pp. 95–101.

Figure 7:
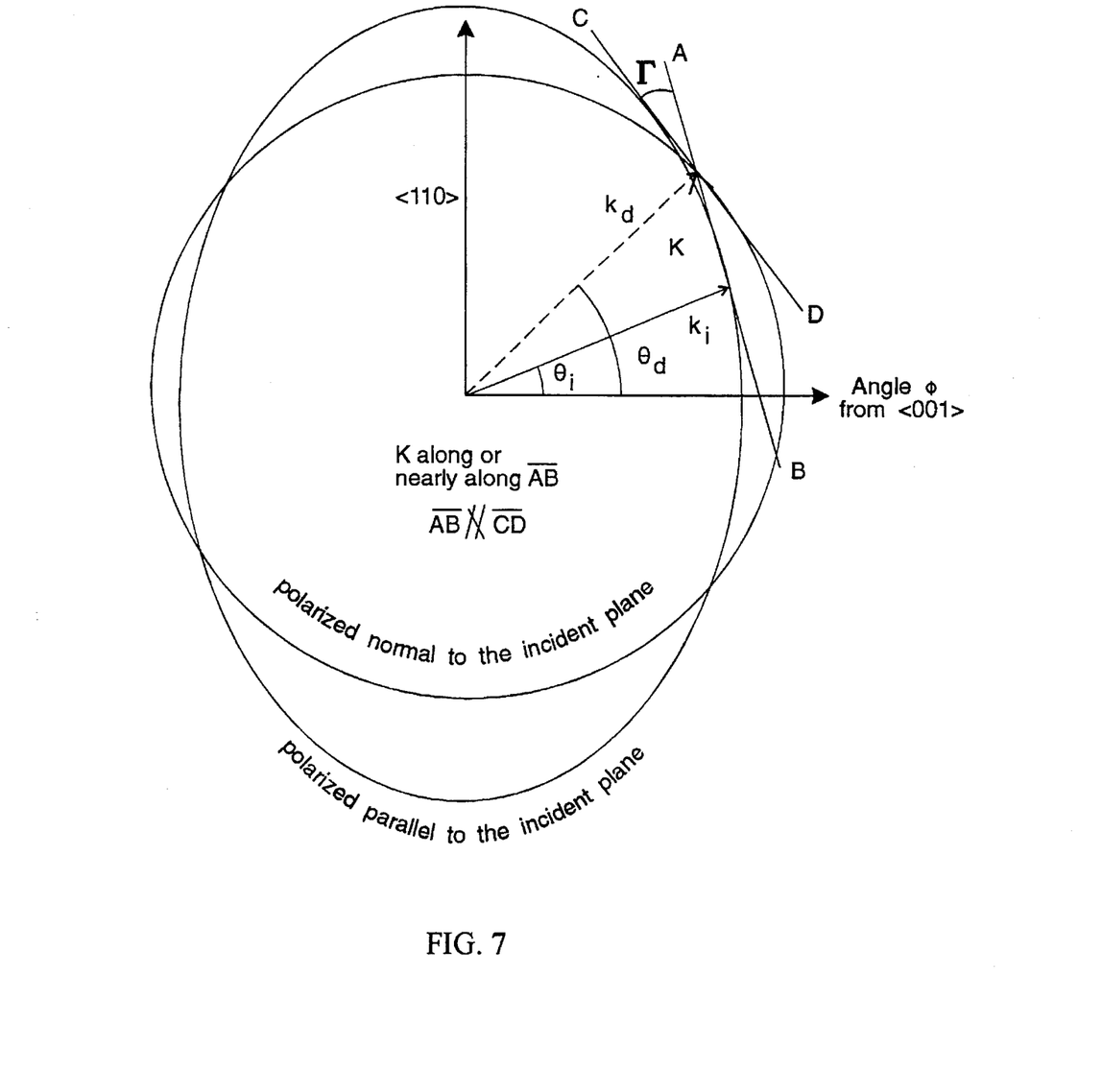
FIG. 7 is a Bragg matching diagram, illustrating how to use optical rotation to adjust or select operating parameters, such as frequency range, acoustic propagation direction, etc. of a polychromatic light modulator in accordance with the invention.

FIG. 7 shows, by means of a Bragg matching diagram, acousto-optic polychromatic modulator designs in TeO$_2$ for a higher speed modulation condition having an optical rotation angle φ. In comparison to the design in FIG. 6, in which no optical rotation is used, the optical rotation in FIG. 7 reduces the operating RF frequency range.

The acousto-optic polychromatic light modulator in accordance with the present invention has many applications in the field of laser light projection, high speed color photography, color printing, wavelength division multiplexing in fiber optic communications, intra (inside) and extra (outside)-laser cavity devices to select the lasing wavelengths, and spectroscopy. A variation of the polychromatic light modulating apparatus shown in the embodiment of FIG. 3 is particularly useful for intra-cavity laser wavelength selection applications.

Figure 8:
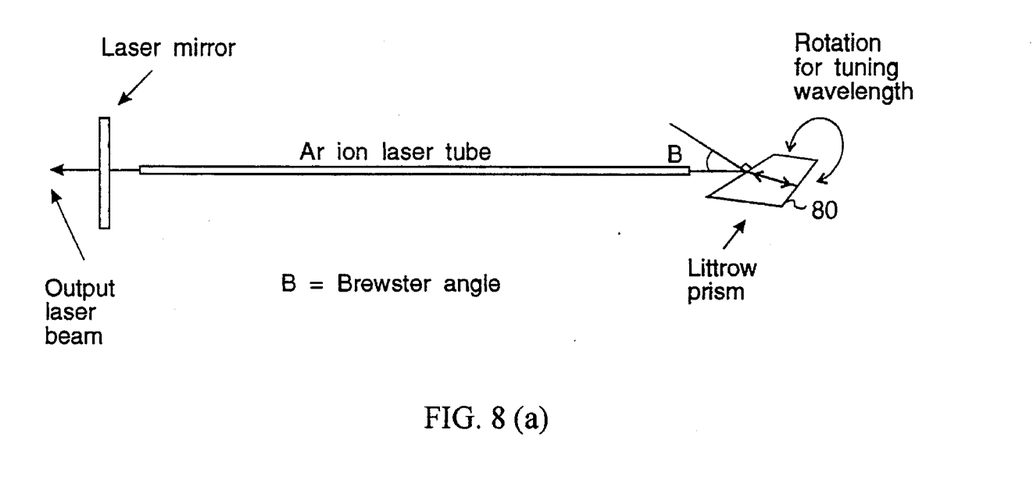
FIGS. 8(a) and 8(b) show prior art mechanisms for tuning or selecting a wavelength by means of dispersive element such as Littrow prism for ion lasers and a Loyt filter for Ti:sapphire or Dye lasers.

More particularly, at present, in discrete line lasers, such as an argon-ion laser, the laser's operational wavelength is selected by a dispersive element, such as a Brewster or Littrow prism disposed within the laser cavity. In tunable, continuous band lasers, such as Dye or Ti:sapphire lasers, a grating or a Loyt filter plate is used as the dispersive element, as diagrammatically illustrated at 80 and 82, respectively, in FIGS. 8(*a*) and 8(*b*). This type of dispersive element allows selection of only a single wavelength for laser oscillation. It is not possible to select more than one wavelength at a time. Moreover, mechanical movement, which is inherently slow and unreliable, is required to tune the wavelength of the laser cavity.

Figure 9:
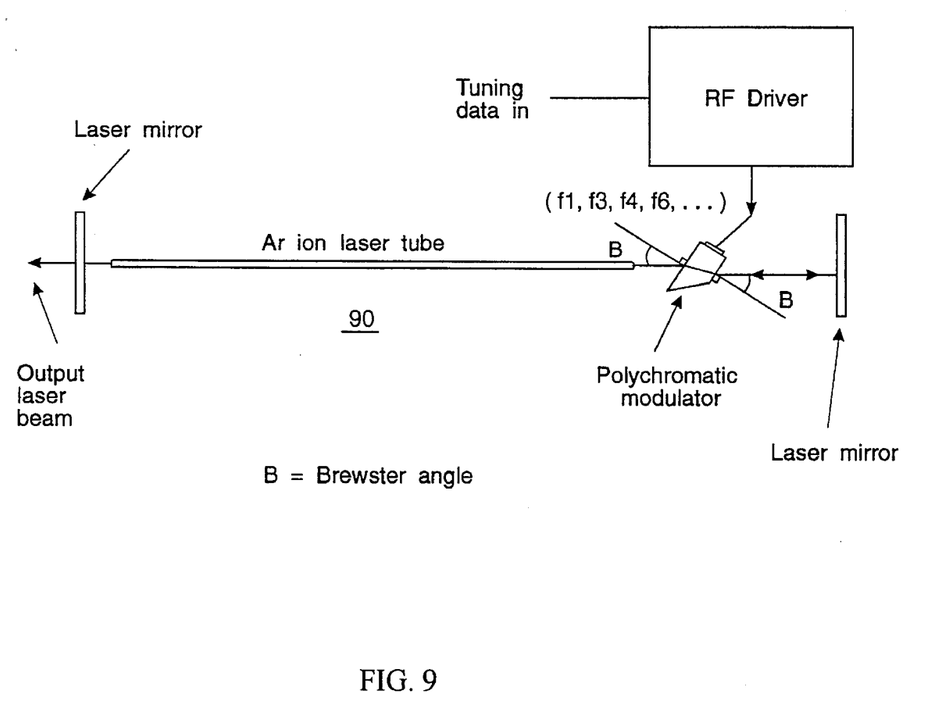
FIG. 9 shows an application of the polychromatic light modulator of the invention to tune a laser at one or more wavelengths of interest in case of discrete line lasers, such as ion (Ar or Kr ion) lasers.
Figure 10:
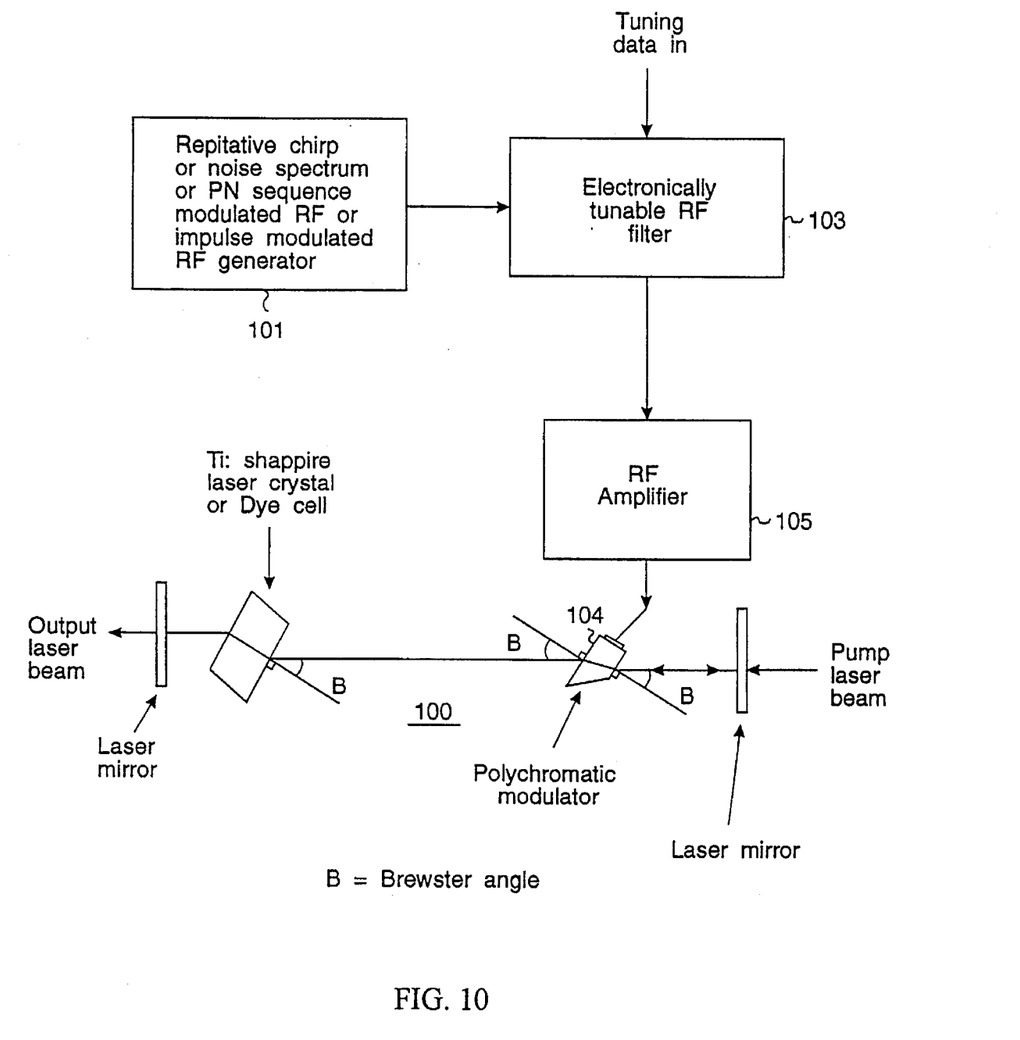
FIG. 10 shows an application of the polychromatic light modulator of the invention to tune the laser at one or more wavelengths of interest in case of (broad band) tunable lasers, such as Dye or Ti:sapphire lasers.

Advantageously, as diagrammatically illustrated in FIG. 9, a polychromatic modulator in accordance with the present invention may be incorporated within the laser cavity 90 of a discrete line laser and, as shown in FIG. 10, in the laser cavity 100 of a continuous band laser, thereby enabling the selection or tuning of one or more wavelengths simultaneously. The RF driver permits the laser to be tuned electronically at high speed, without mechanical movement of any physical components, such as the prism and filter arrangements of FIGS. 8(*a*) and 8(*b*).

TeO$_2$ or other well known, high efficiency, but softer acousto-optic materials are unsuitable for intra-laser cavity applications, because of their high insertion loss. Fused quartz is the most commonly used material for intra-cavity applications. Crystalline quartz, being similar to fused quartz, has proven to work equally well as fused quartz for intra-cavity applications. Crystalline quartz, being a birefringent material, is usable a bulk material in the polychromatic modulator of the invention for intra-cavity laser wavelength selection applications.

A crystalline quartz polychromatic modulator having several different shear acoustic modes (such as a shear acoustic wave propagation direction within a plane normal to the optic axis (c-axis) of quartz, and a shear polarization either along or perpendicular to the optic axis), which provide spectral selectivity of approximately 10 nm and an angular selectivity of approximately 2 mr. Brewster angle-defined incident and exit faces (on the order of 57° for the light beam entrance and exit faces), as shown in FIGS. 9 and 10 are selected for such devices in order to minimize insertion loss. The acousto-optic figure of merit in each case was checked to provide a sufficiently high acousto-optic figure of merit, so that the wavelength selector can be operated with less than about 2 W of RF drive power for either ion (Ar and Kr), Dye or Ti:sapphire lasers.

In intra-cavity laser applications, rather than use the diffracted portion of polychromatic light (from the polychromatic light modulator), the undiffracted light is more important (useful). Moreover, the polychromatic modulator need not diffract more than 10% of light intensity at each wavelength in a majority of the cases. Even a small fraction of light (typically 1% to 5%) diffracted away at a given wavelength could suppress laser operation at that wavelength. In addition, instead of color convergence of the diffracted first order output beam, color convergence of the zero order is essential in intra-cavity applications, due to the use of undiffracted portion of light. What is useful, in such cases, is the negligible inter-color modulation property of the polychromatic light modulator of the present invention. This property makes it possible to diffract away all possible wavelengths except those of interest for laser operation with a negligible loss for the undiffracted wavelengths.

In the laser cavity tuning application of FIG. 9 the polychromatic light modulator is shown as being placed inside laser cavity 90 (e.g. an argon-ion laser cavity). RF drive frequencies corresponding to those wavelengths among the argon-ion laser lines not desired in the output laser beamare selected for the drive. The loss introduced by the polychromatic modulator for the wavelengths inhibits laser oscillation for those wavelengths.

An RF driver, similar to the laser projector application of FIG. 3, and employed in the configuration of FIG. 9, is useful for wavelength selection in argon-ion and other similar lasers having discrete lasing lines. In lasers having continuous broadband gain profiles, such as dye or Ti:sapphire lasers, all light except that having the selected spectrum for lasing must be diffracted. As shown in FIG. 10, to diffract broad spectrum light, either a frequency chirp, RF noise spectrum, or a PN sequence or impulse modulated RF, etc. source 101 can be used to cover the entire spectrum of the laser gain. A tunable (either electronically or by other means) RF filter is interposed between the RF driver 105 and the polychromatic modulator, either upstream of the modulator cell 104 or, more practically, prior to the final RF amplifier 105, as shown. The RF filter 103 is employed to prevent a selected frequency band or bands of RF energy from reaching the polychromatic modulator. The selected RF band or bands for the filter correspond to the desired lasing wavelength or wavelengths for the laser.

The diffracted +1 and −1 order beams from a polychromatic light modulator as shown in FIG. 3 are orthogonally polarized and each (first order diffracted beam) results from its orthogonally polarized incident beam. In other words, if the incident optical beam is randomly polarized and the output beam is restricted to, for example, only the diffracted +1 order, then the part of light intensity within the incident beam having polarization identical to this +1 order is not useful and wasted. In polychromatic light modulation applications in which the incident beam is randomly polarized the modulator as shown in FIG. 3 would have a limited 50% throughput. A polarization independent polychromatic light modulator would be advantageous in such cases.

The polychromatic light modulator as shown in FIG. 3 is capable of diffracting both incident optical beam polarizations; one incident polarization is diffracted into a +1 order beam, while the other (orthogonal to the first) diffracts into a −1 order beam. The propagation directions of the +1 and −1 order beams are generally non-collinear. Moreover, the color convergence design for the +1 and −1 order beams require different set of Bi, $\alpha_i$, and $\alpha_o$. As a consequence, color convergence cannot be achieved simultaneously for both +1 and −1 order beams. Some variation of the basic architecture shown in FIG. 3 is necessary in order to make the polychromatic light modulator polarization independent.

When an incident polychromatic light beam is randomly polarized one may choose the output containing orthogonally polarized +1 and −1 order polychromatic beams in a variety of ways, such as: 1—a convergent polychromatic output beam containing both polarizations with independently controllable wavelengths, but no independent polarization control, 2—a convergent polychromatic output beam containing both polarizations with independently controllable wavelengths and polarizations, and 3—two separate but individually convergent polychromatic output beams, one for each polarization, with its own wavelength selection. In the last case 3, it may be desired to obtain two output beams having a common propagation direction, but with spatial separation; differing propagation directions may also be desired as well.

Investigation of these possibilities has revealed that using a combination of a birefringent plate (also known as Wollaston plate or prism) to spatially separate and combine two orthogonally polarized optical beams, and separate facets for two polarizations at the entrance and exit face of the modulator body, the desired result can be Obtained in each case.

Figure 11A:
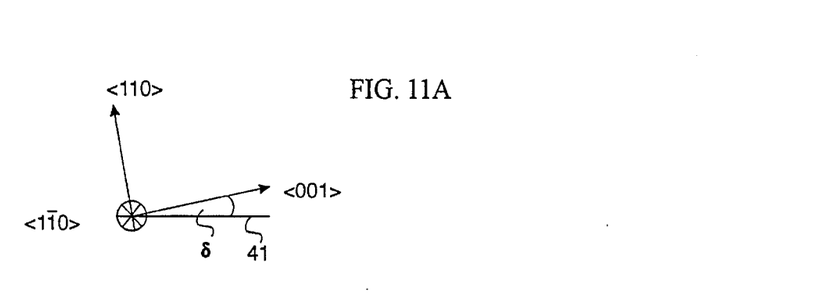
FIG. 11A is a crystal coordinate axis diagram associated with FIG. 11.
Figure 11B:
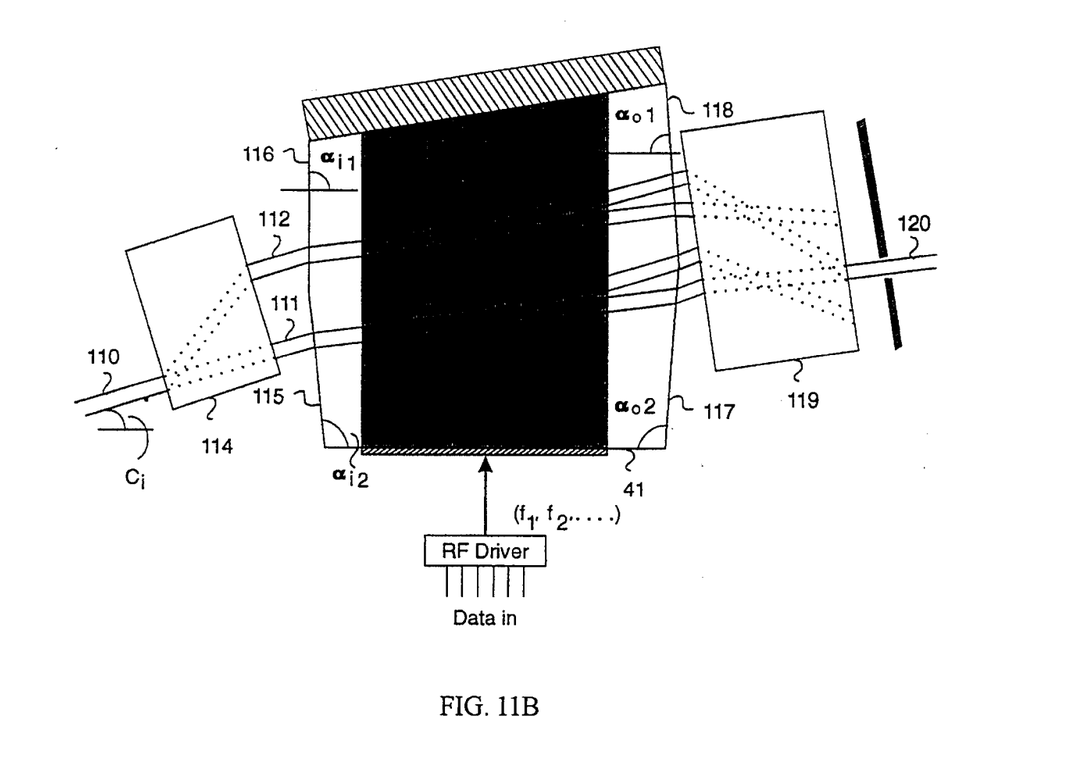
FIG. 11B shows the use of a birefringent plate (also known as a Wollaston plate or prism) and multi-faceted input/output optical surfaces on a polychromatic light modulator body to make the polychromatic modulator function independent of light polarizations.

FIG. 11 shows a polarization independent polychromatic light modulator. The randomly polarized polychromatic input light beam 110, at an angle Ci from the transducer bonding face 41, is first spatially separated into two orthogonally polarized beams 111 and 112 using a birefringent plate 114. The entrance face of the modulator body has two facets 115 and 116 with respective angles from the transducer bonding face 41 at $\alpha_i 1$ and $\alpha_i 2$ to provide independent incident angle for two polarization states. The RF frequencies and drive levels are selected to cover all desired wavelengths and its polarizations. The exit face of modulator body also has two facets 117 and 118 at respective angles, $\alpha_o 1$ and $\alpha_o 2$, from the transducer bonding face 41 for independent exit angles for each polarization. A birefringent plate 119 on the output side combines two orthogonally polarized polychromatic output beams into a single convergent beam 120. If the desired output consists of two orthogonally polarized individually color convergent separated beams, then birefringent plate 119 is eliminated. Calculations show that at Ci=55°, $\alpha_i 1$=0°, $\alpha_o 1$=87.93°, $\alpha_i 2$=92.07°, and $\alpha_o 2$=0° in far-off-axis mode TeO$_2$, the first order diffracted beams for each polarization emerge the modulator body in precisely the same direction as the incident optical beam, and the RF drive frequency for any selected wavelength within the visible range is independent of the polarization state.

As will be appreciated from the foregoing description, drawbacks of conventional polychromatic acousto-optic modulator configurations are effectively obviated by an acousto-optic polychromatic light modulating apparatus in accordance with the present invention, which employs an acousto-optic medium, and a single piezoelectric transducer, which is driven by a plurality of frequency components, the intensities of which are controlled in response to input electronic data, to produce a desired color beam output from the diffracted polychromatic output beam.

In the polychromatic modulator of the invention, the acousto-optic medium and mode as well as acousto-optic interaction length and the geometry of the device are selected such that there is negligible acousto-optic interaction with a given frequency signal on all output optical beam colors except for the one assigned to that frequency, with a high degree of color convergence achieved over a wide wavelength range. The present invention can be used to increase the modulation rate of a polychromatic modulator by selecting the incident optical beam energy propagation direction to be nearly normal to the acoustic wave phase propagation direction with non-parallel tangents at the incident and diffracted optical wave-vector loci.

Moreover, the polychromatic modulator in accordance with the present invention may be incorporated within the laser cavity of a discrete line laser and in the laser cavity of a continuous band laser, thereby enabling the selection or tuning of one or more wavelengths simultaneously. The use of a multi-frequency input RF driver enables the laser to be tuned electronically at high speed, without mechanical movement of any physical components.

While I have shown and described several embodiments in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. An acousto-optic polychromatic light modulating apparatus comprising an acousto-optic medium, a piezoelectric transducer attached to said acousto-optic medium and operative to convert electrical signals supplied thereto into ultrasonic waves, said ultrasonic waves being launched from said piezoelectric transducer into said acousto-optic medium for interaction with a substantially collinear polychromatic light beam incident upon and traveling through said acousto-optic medium, an electronic driver which is coupled to said piezoelectric transducer and which generates signals containing a plurality of RF frequencies at respectively controllable amplitudes, thereby selecting a desired combination of wavelengths in a substantially collinear polychromatic output beam diffracted from said acousto-optic medium, and wherein said acousto-optic medium, its mode and acousto-optic interaction length thereof are such that there is effective interaction by respective ones of said plurality of RF frequencies with respectively different predetermined wavelengths contained in said polychromatic output beam.

2. An acousto-optic polychromatic light modulating apparatus according to claim 1, wherein said substantially collinear incident light beam is a linearly polarized polychromatic light beam and said substantially collinear diffracted polychromatic output beam is a first order diffracted beam having a polarization orthogonal to the polarization of the incident light beam.

3. An acousto-optic polychromatic light modulating apparatus according to claim 1, wherein said substantially collinear incident light beam is a linearly polarized polychromatic light beamand wherein said substantially collinear diffracted polychromatic output beam is a zeroth order beam having a polarization identical to the polarization of the incident light beam.

4. An acousto-optic polychromatic light modulating apparatus according to claim 1, wherein said RF driver generates one of a repetitive frequency chirp, noise spectrum, and an impulse-modulated RF, PN sequence-modulated RF output, having a desired frequency content and repetition period, and wherein a tunable RF filter is interposed between said RF driver and said acousto-optic mediumto prevent one or more frequency bands from said RF driver from being output to said transducer.

5. An acousto-optic polychromatic light modulating apparatus according to claim 1, wherein said acousto-optic medium is configured and arranged to employ far-off-axis anisotropic Bragg diffraction.

6. An acousto-optic polychromatic light modulating apparatus according to claim 1, wherein said acousto-optic medium is configured and arranged to employ parallel tangents to the loci of incident and diffracted optical wave vectors.

7. An acousto-optic polychromatic light modulating apparatus according to claim 1, wherein said acousto-optic medium is configured and arranged to employ anisotropic Bragg diffraction, and has an acoustic phase propagation direction substantially along a tangent to a locus of an incident optical wave vector, so as to improve modulation speed.

8. An acousto-optic polychromatic light modulating apparatus according to claim 1, wherein said acousto-optic medium has entrance and exit optical faces which are non-parallel by at least 0.5 degrees, so as to accept and output a substantially collinear polychromatic light beam.

9. An acousto-optic polychromatic light modulating apparatus according to claim 1, wherein optical rotation of said acousto-optic medium is chosen to define a desired RF drive frequency range and polychromatic modulator characteristics.

10. An acousto-optic polychromatic light modulating apparatus according to claim 1, wherein said transducer is an apodized transducer for reducing side lobes or inter-color modulation effects.

11. An acousto-optic polychromatic light modulating apparatus according to claim 1, wherein said acousto-optic medium comprises a material selected from the group consisting of $TeO_2$, $Hg_2Cl_2$, $Hg_2Br_2$, $Hg_2I_2$, $PbCl_2$, $PbBr_2$, $Tl_3AsS_4$, $Tl_3VS_4$, $Tl_3NbS_4$, $Tl_3AsSe_3$, $Tl_3TaS_4$, $Tl_3TaSe_4$, $CaMoO_4$, $LiNbO_3$, $CaWoO_4$, $PbMoO_4$, and crystalline quartz.

12. An acousto-optic polychromatic light modulating apparatus comprising:

an acousto-optic medium having a first face from which an acoustic wave is to be launched into said medium for interaction with a polychromatic input light beam, a second face upon which multiple color components of said polychromatic input light beam are collinearly incident, and a third face from which a light beam travelling through said acousto-optic medium is diffracted;

a piezoelectric transducer mounted on the first face of said acousto-optic medium and to which a multi-frequency RF input signal is applied, said piezoelectric transducer being operative to launch a multi-frequency acoustic wave into said acousto-optic medium for interaction with said polychromatic input light beam as it travels through said acousto-optic medium; and a multi-frequency RF signal driver which is operative to generate a plurality of RF signals for selective application to said piezoelectric transducer in order to control the launching of acoustic waves by said transducer, such that a respective one of an RF signal that has been selected from among the plurality of RF signals generated by said RF signal driver for application to said piezoelectric transducer effectively interacts with only a respective one wavelength component of said polychromatic light beam, said respective one wavelength being different from another wavelength component of said polychromatic light beam, thereby modulating the wavelength composition of said polychromatic light beam and producing a color composition-modulated polychromatic output light beam the respective color components of which are collinearly diffracted from said third face of said acousto-optic medium.

13. An acousto-optic polychromatic light modulating apparatus according to claim 12, wherein said polychromatic input light beam is linearly polarized.

14. An acousto-optic polychromatic light modulating apparatus according to claim 12, wherein said multi-frequency RF signal driver which is operative to apply a plurality of RF signals to said piezoelectric transducer in order to control the launching of multi-frequency acoustic waves by said transducer, such that each respective RF signal among the plurality of RF signals applied by said RF signal driver to said piezoelectric transducer effectively interacts with a respectively different wavelength component of said polychromatic light beam.

15. An acousto-optic polychromatic light modulating apparatus according to claim 12, wherein said diffracted polychromatic output light beam is a first order diffracted beam having a polarization orthogonal to the polarization of said input light beam.

16. An acousto-optic polychromatic light modulating apparatus according to claim 12, wherein said diffracted polychromatic output light beam is a zeroth order beam having a polarization identical to the polarization of said input light beam.

17. An acousto-optic polychromatic light modulating apparatus according to claim 12, wherein said RF signal driver generates one of a repetitive frequency chirp, noise spectrum, an impulse-modulated RF output and a PN sequence-modulated RF output, having a desired frequency content and repetition period, and wherein a tunable RF filter is interposed between said RF signal driver and said acousto-optic medium to prevent one or more frequency bands from said RF signal driver from being applied to said transducer.

18. An acousto-optic polychromatic light modulating apparatus according to claim 12, wherein said acousto-optic medium is configured and arranged to employ far-off-axis anisotropic Bragg diffraction.

19. An acousto-optic polychromatic light modulating apparatus according to claim 12, wherein said acousto-optic medium is configured and arranged to employ parallel tangents to the loci of incident and diffracted optical wave vectors.

20. An acousto-optic polychromatic light modulating apparatus according to claim 12, wherein said acousto-optic medium is configured and arranged to employ anisotropic Bragg diffraction, and has an acoustic phase propagation direction substantially along a tangent to a locus of an incident optical wave vector, so as to improve modulation speed.

21. An acousto-optic polychromatic light modulating apparatus according to claim 12, wherein said second and third faces of said acousto-optic medium are non-parallel by at least 0.5 degrees.

22. An acousto-optic polychromatic light modulating apparatus according to claim 12, wherein optical rotation of said acousto-optic medium is chosen to define a desired RF drive frequency range and polychromatic modulator characteristics.

23. An acousto-optic polychromatic light modulating apparatus according to claim 12, wherein said transducer is an apodized transducer.

24. An acousto-optic polychromatic light modulating apparatus according to claim 12, wherein said acousto-optic medium comprises a material selected from the group consisting of $TeO_2$, $Hg_2Cl_2$, $Hg_2Br_2$, $Hg_2I_2$, $PbCl_2$, $PbBr_2$, $Tl_3AsS_4$, $Tl_3VS_4$, $Tl_3NbS_4$, $Tl_3AsSe_3$, $Tl_3TaS_4$, $Tl_3TaSe_4$, $CaMoO_4$, $LiNbO_3$, $CaWoO_4$, $PbMoO_4$, and crystalline quartz.

25. A method of modulating a polychromatic light beam comprising the steps of:
  (a) directing said polychromatic light beam having multiple color components which are collinearly incident upon a first face of an acousto-optic medium, said acousto-optic medium having a second face from which an acoustic wave is to be launched into said medium for interaction with said polychromatic light beam as it travels through said acousto-optic medium, and a third face from which a modulated polychromatic output light beam is diffracted;
  (b) generating a plurality of RF signals; and
  (c) launching a multi-frequency acoustic wave from said second face into said acousto-optic medium for interaction with said polychromatic light beam as it travels through said acousto-optic medium in accordance with the plurality of RF signals generated in step (b), such that each RF signal among the plurality of RF signals generated in step (b) effectively interacts with a respectively different wavelength component of said polychromatic light beam, thereby modulating respectively different wavelength components of said polychromatic light beam to produce a color composition-modulated polychromatic output light beam the respective color components of which are collinearly diffracted from said third face of said acousto-optic medium.

26. A method according to claim 25, wherein said polychromatic light beam is linearly polarized and wherein said diffracted polychromatic output light beam is a first order diffracted beam having a polarization orthogonal to the polarization of said polychromatic light beam.

27. A method according to claim 25, wherein said polychromatic light beam is linearly polarized and wherein said diffracted polychromatic output light beam is a zeroth order beam having a polarization identical to the polarization of said polychromatic light beam.

28. A method according to claim 25, wherein step (b) comprises generating one of a repetitive frequency chirp, noise spectrum, an impulse-modulated RF output, and a PN sequence-modulated RF output, having a desired frequency content and repetition period, and coupling the generated one of the repetitive frequency chirp, noise spectrum, impulse-modulated RF output, and PN sequence-modulated RF output, through a tunable RF filter disposed in a signal application path to said acousto-optic medium, so as to prevent one or more RF frequency bands from being contained in the multi-frequency acoustic wave launched from said second face into said acousto-optic medium in step (c).

29. A method according to claim 25, wherein said acousto-optic medium is configured and arranged to employ far-off-axis anisotropic Bragg diffraction.

30. A method according to claim 25, wherein said acousto-optic medium is configured and arranged to employ parallel tangents to the loci of incident and diffracted optical wave vectors.

31. A method according to claim 25, wherein said acousto-optic medium is configured and arranged to employ anisotropic Bragg diffraction, and has an acoustic phase propagation direction substantially along a tangent to a locus of an incident optical wave vector.

32. A method according to claim 25, wherein said first and third faces of said acousto-optic medium are non-parallel by at least 0.5 degrees.

33. A method according to claim 25, wherein said acousto-optic medium has an optical rotation which defines a desired RF drive frequency range and polychromatic modulator characteristics.

34. A method according to claim 25, wherein step (c) comprises launching said multi-frequency acoustic wave from an apodized transducer mounted upon said second face of said acousto-optic medium.

35. A method according to claim 25, wherein said acousto-optic medium comprises a material selected from the group consisting of $TeO_2$, $Hg_2Cl_2$, $Hg_2Br_2$, $Hg_2I_2$, $PbCl_2$, $PbBr_2$, $Tl_3AsS_4$, $Tl_3VS_4$, $Tl_3NbS_4$, $Tl_3AsSe_3$, $Tl_3TaS_4$, $Tl_3TaSe_4$, $CaMoO_4$, $LiNbO_3$, $CaWoO_4$, $PbMoO_4$, and crystalline quartz.

36. A polarization independent acousto-optic polychromatic light modulating apparatus comprising at least one birefringent plate, an acousto-optic medium having an entrance face and an exit face, said birefringent plate being placed in the vicinity of either the entrance face, the exit face or both the entrance and exit faces of said acousto-optic medium, a piezoelectric transducer attached to said acousto-optic medium and operative to convert electrical signals supplied thereto into ultrasonic waves, said ultrasonic waves being launched from said piezoelectric transducer into said acousto-optic medium for interaction with a substantially collinear randomly polarized polychromatic light beam incident upon and traveling through said birefringent plate and said acousto-optic medium, an electronic driver which is coupled to said piezoelectric transducer and which generates signals containing a plurality of RF frequencies at respectively controllable amplitudes, thereby selecting a desired combination of wavelengths as well as polarization states in no more than two individually substantially collinear polychromatic output beams diffracted from said acousto-optic interaction medium, and wherein said acousto-optic medium, its mode and acousto-optic interaction length thereof are such that there is effective interaction by a respective one of said plurality of RF frequencies with only a predetermined wavelength contained in said polychromatic output beam.

37. An acousto-optic polychromatic light modulating apparatus comprising an acousto-optic medium, an acoustic wave launching transducer attached to said acousto-optic medium and operative to simultaneously receive a plurality of RF signals having respectively different RF frequencies and, in response thereto, to simultaneously launch a plurality of acoustic waves having respectively different frequencies associated with the respectively different RF frequencies applied thereto, said acousto-optic medium receiving a substantially co-linear polychromatic light beam incident upon and travelling through said acousto-optic medium and exiting said acousto-optic medium, such that respectively different ones of said plurality of acoustic waves associated with respectively different RF frequencies launched by said transducer interact with respectively different optical wavelength components of said polychromatic light beam, so as define a composite color output polychromatic light beam having color components thereof defined in accordance with said respectively different RF frequencies.

* * * * *